United States Patent
Johnson

(10) Patent No.: US 12,395,581 B1
(45) Date of Patent: Aug. 19, 2025

(54) MOBILE PHONE CASE WITH PRIVACY COVERS

(71) Applicant: Andy Lee Johnson, Bentonville, AR (US)

(72) Inventor: Andy Lee Johnson, Bentonville, AR (US)

( * ) Notice: Subject to any disclaimer, the term of this patent is extended or adjusted under 35 U.S.C. 154(b) by 0 days.

(21) Appl. No.: 18/802,565

(22) Filed: Aug. 13, 2024

(51) Int. Cl.
  *H04M 1/03* (2006.01)
  *A45C 11/00* (2006.01)

(52) U.S. Cl.
  CPC ............... *H04M 1/03* (2013.01); *A45C 11/00* (2013.01); *A45C 11/002* (2025.01)

(58) Field of Classification Search
  CPC ..... H04M 1/03; A45C 11/00; A45C 2011/002
  See application file for complete search history.

(56) References Cited

U.S. PATENT DOCUMENTS

| | | | |
|---|---|---|---|
| 7,581,893 B2 | 9/2009 | Miramontes | |
| 9,369,170 B2 | 6/2016 | Sorrentino | |
| 11,770,150 B2 | 9/2023 | Feng | |
| 2016/0352384 A1 | 12/2016 | Ageishi | |
| 2017/0026498 A1* | 1/2017 | Goldfain | H02J 7/342 |
| 2019/0018305 A1 | 1/2019 | Gahche | |
| 2022/0114287 A1 | 4/2022 | DiSalvo | |
| 2024/0073309 A1* | 2/2024 | Short | H04M 1/185 |

* cited by examiner

*Primary Examiner* — Fatuma G Sherif
(74) *Attorney, Agent, or Firm* — Dale J. Ream

(57) ABSTRACT

A mobile phone case includes a cradle for receiving the smartphone in a friction fit configuration, an upper frame portion coupled to an upper section of the cradle and a lower frame portion coupled to a lower section of the cradle via upper and lower rail assemblies, respectively. The upper and lower frame portions are slidably movable between a closed configuration covering the upper and lower microphones and the front and rear cameras of the smartphone, respectively, and an open configuration not covering them. The upper and lower frame portions include dampening members configured to block audio and visual signals when closed. The mobile phone case includes a spring-biased selector assembly coupled to the cradle portion and operatively coupled to the upper and lower frame portions for simultaneously urging the upper and lower frame portions toward the open configuration when actuated.

17 Claims, 13 Drawing Sheets

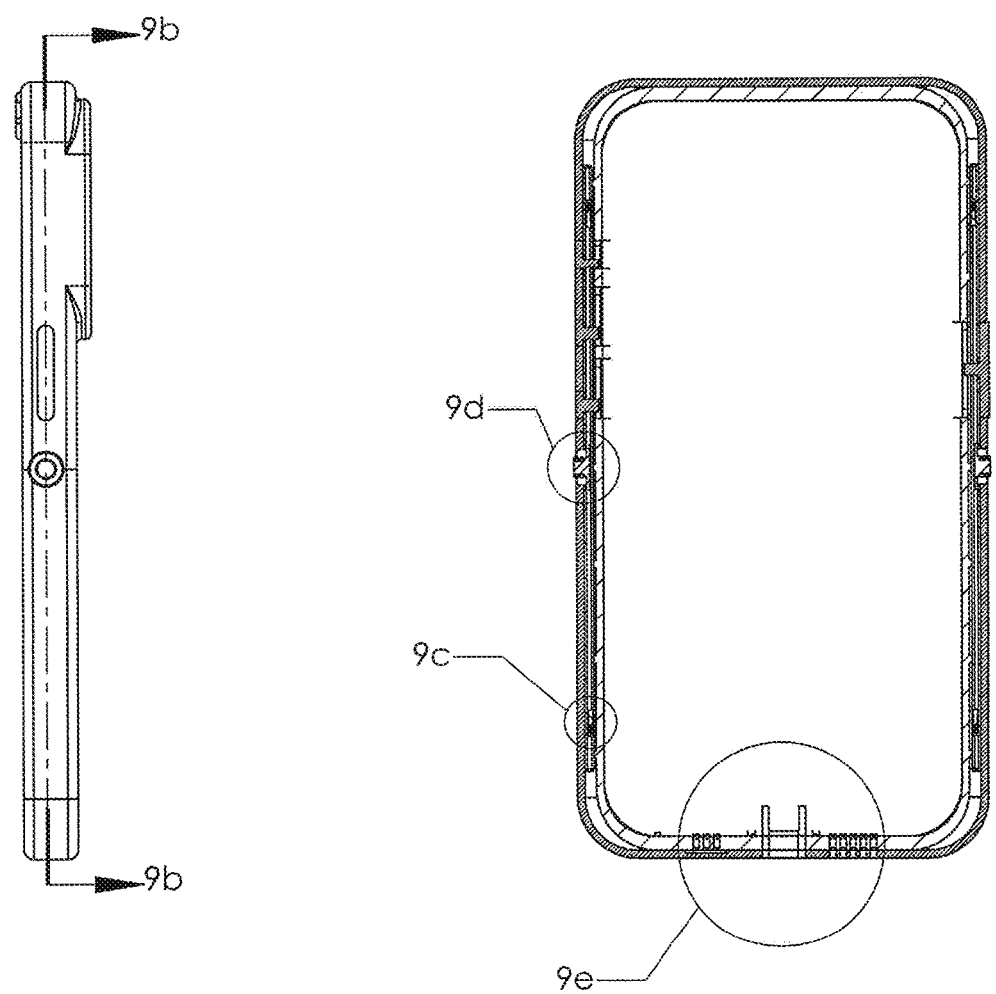
Fig. 9a
Fig. 9b
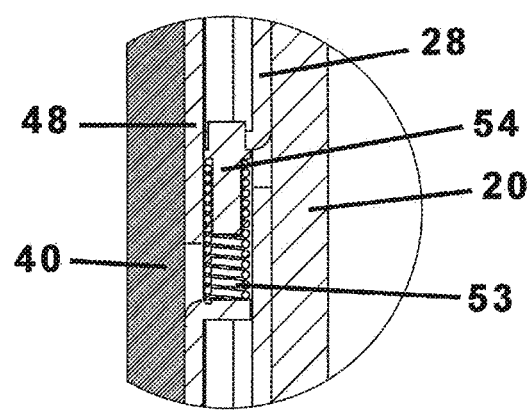
Fig. 9c

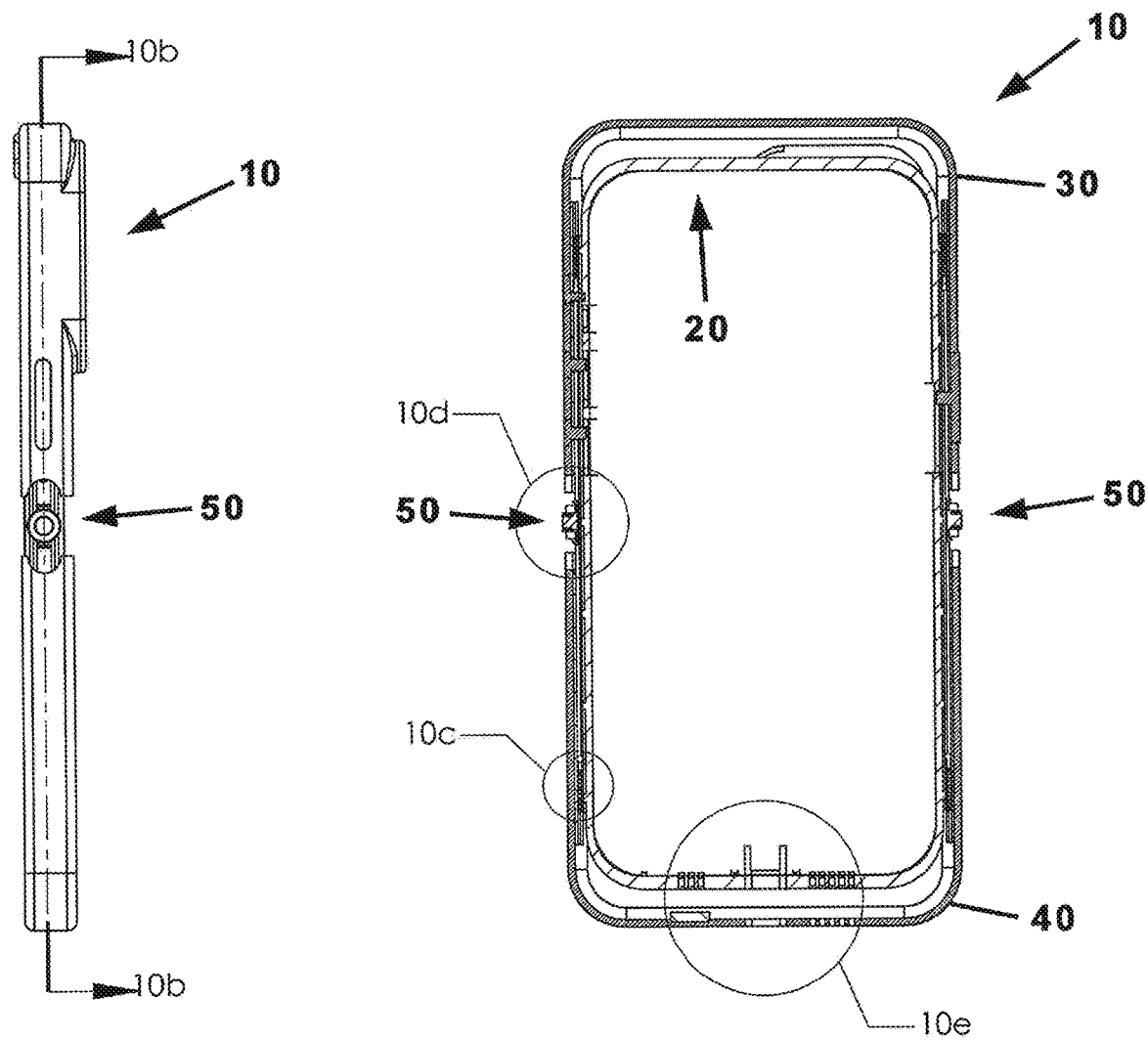
Fig. 10a
Fig. 10b
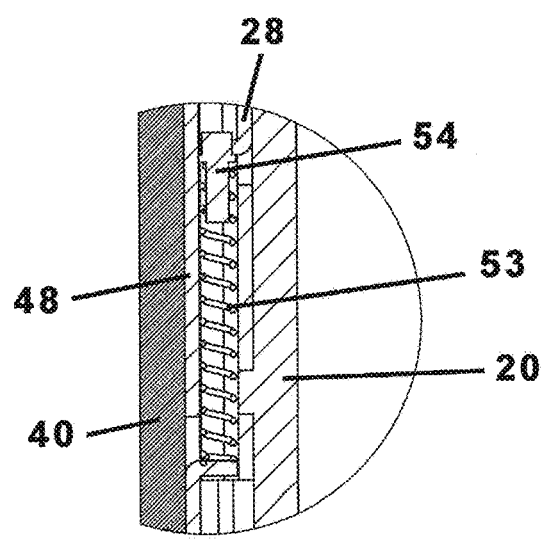
Fig. 10c

Fid. 10d

MOBILE PHONE CASE WITH PRIVACY COVERS

BACKGROUND OF THE INVENTION

This invention relates generally to cell phone cases, and more particularly, to a hardware solution applied to a cell phone case for selectively covering one or both cameras and microphones of a smart phone mounted in the case.

In today's digital age, smartphones are integral to our daily lives, acting as portals to our private worlds. The security risks associated with third-party access to an individual's personal phone, particularly its cameras and microphones, are profound. Such risks include privacy invasion, in which third parties covertly record conversations and capture images or videos without the user's consent, often for blackmail or extortion; identity theft, in which passwords, personal identification numbers, and private conversations are intercepted; and corporate espionage, in which business professionals may be targeted for sensitive company information. Even surveillance by governments and law enforcement agencies, when conducted without proper legal oversight, can lead to unauthorized monitoring of individuals.

To mitigate these risks, several specialized phone cases have been designed. These use either physical shutters or adhesive stickers to cover the camera lenses and plug the microphone ports of the smart phone mounted in the case. Unfortunately, both solutions have serious flaws. Stickers require manual application and removal, which is impractical, and tend to lose their stickiness over time. Physical shutters also have shortcomings. Examples in the prior art show camera and microphone shutters integrated into the phone case and operating via a sliding/hinging mechanism. These examples, while efficient at blocking camera lenses, offer only partial acoustic shielding, allowing the microphones to still capture some sound. However, as common sense would indicate, exposed microphones are just as risky as exposed cameras, if not more so, as most individuals have their phone with them at all times, even during the most intimate and confidential of conversations.

A solution to these shortcomings would be a new type of phone case with a novel mechanism. This phone case would feature a bottom portion and a top portion that would move toward each other (into a closed position) or away from each other (into an open position) via a set of rails. The mechanism would engage at the push of a button. When open, the cameras and microphones would be free to function normally, but when closed, the cameras and microphones would be covered with a sound-blocking material, effectively preventing any unauthorized recording or capturing of images. This mechanism would offer robust protection against privacy breaches without the need for manual adjustments.

Therefore, it would be desirable to have a cell phone case having an upper portion and a lower portion that may be moved toward or away from one another along linear rails, in other words, the portions are slidable between an open position exposing the cameras and microphone and a closed position having foam or rubber that blocks the camera and/or microphone. Furthermore, it would be desirable to have a cell phone case with an upper front end and upper back portion that may be independently slidable such that only a front or a back camera is blocked or exposed. Additionally, it would be desirable for the phone's output speaker not to be covered, allowing a user to listen to a caller, music, or the like if he so chooses.

SUMMARY OF THE INVENTION

A mobile phone case having privacy controls for a smartphone of a type having a front camera, a rear camera, an upper microphone, and a lower microphone includes a cradle portion capable of receiving the smartphone in a friction fit configuration. The mobile phone case includes an upper frame portion coupled to an upper section of the cradle portion via an upper track assembly and a lower frame portion coupled to a lower section of the cradle portion via a lower rail assembly. The upper and lower frame portions are slidably movable along the upper and lower track assemblies, respectively, between a closed configuration covering the upper and lower microphones and the front and rear cameras of the smartphone, respectively, and an open configuration not covering the upper and lower microphones or the front and rear cameras of the smartphone, respectively.

In a critical aspect, the mobile phone case includes a selector assembly coupled to the cradle portion and operatively coupled to the upper and lower frame portions for simultaneously urging the upper and lower frame portions toward the open configuration when actuated. The upper and lower frame portions include dampening members configured to block audio signals and visual images when the upper and lower frame portions are in the closed configurations, respectively.

Therefore, a general object of this invention is to provide a mobile phone case with privacy covers for blocking the microphone and camera elements of a smartphone when the phone is not in use.

Another object of this invention is to provide a mobile phone case with privacy covers, as aforesaid, having upper and lower portions that are slidably movable along corresponding rail assemblies between open and closed configurations.

Still another object of this invention is to provide a mobile phone case with privacy covers, as aforesaid, that includes acoustic foam specifically configured to selectively dampen or absorb audio and video signals.

Yet another object of this invention is to provide a mobile phone case with privacy covers, as aforesaid, that does not inhibit normal usage of a smartphone that is inserted into the mobile phone case.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3a is a perspective front view of the mobile phone case in use with a smart phone as in FIG. 1a;

FIG. 3b is an isolated view on an enlarged scale taken from FIG. 3a;

FIG. 4 is an exploded view of the mobile phone case in use with a smart phone as in FIG. 1a;

FIG. 8b is a sectional view taken along line 8b-8b of FIG. 8a;

FIG. 8d is a sectional view taken along line 8d-8d of FIG. 8a;

FIG. 9a is a side view of the mobile phone case in use with a smart phone as in FIG. 1a;

FIG. 9b is a sectional view taken along line 9b-9b of FIG. 9a;

FIG. 9c is an isolated view on an enlarged scale taken from FIG. 9b;

FIG. 10a is a side view of the mobile phone case in use with a smart phone as in FIG. 3a;

FIG. 10b is a sectional view taken along line 10b-10b of FIG. 10a;

FIG. 10c is an isolated view on an enlarged scale taken from FIG. 10b;

FIG. 10d is an isolated view on an enlarged scale taken from FIG. 10b; and

DESCRIPTION OF THE PREFERRED EMBODIMENT

A mobile phone case with privacy covers according to a preferred embodiment of the present invention will now be described with reference to the accompanying drawings. The cell phone case 10 includes a cradle portion 20, an upper portion 30, and a lower portion 40 that are selectively movable between open and closed configurations.

Figure 3A:
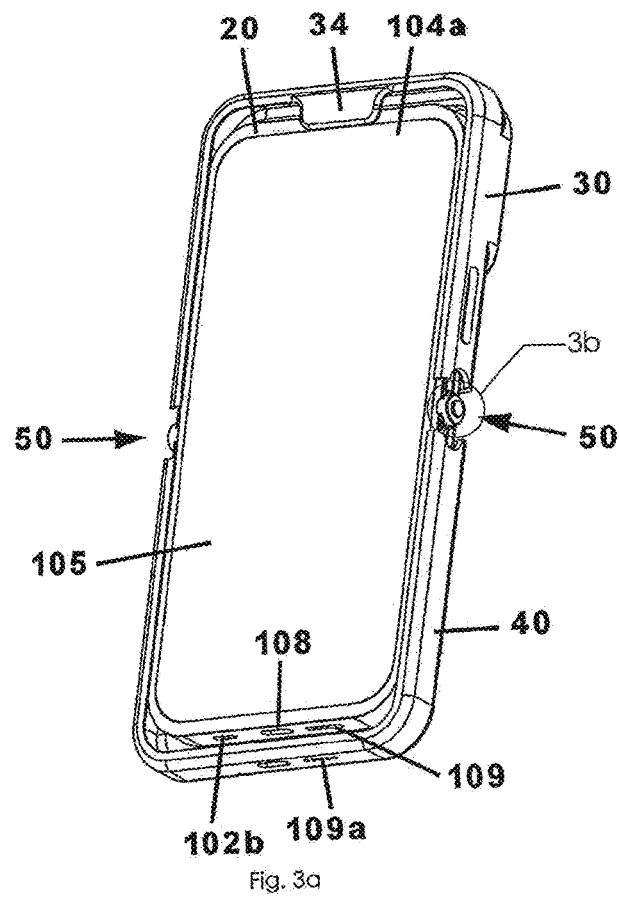
Figure 3B:
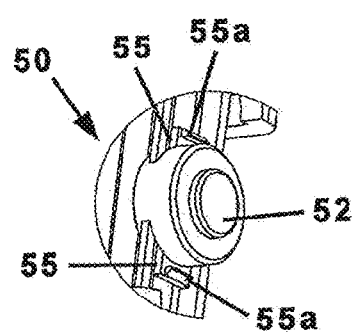
Figure 3C:
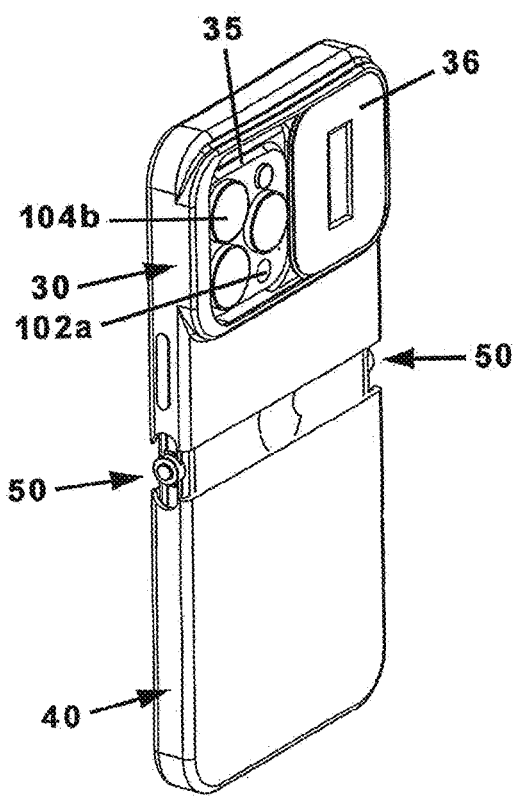
FIG. 3c is a perspective rear view of the mobile phone case in use with a smartphone as in FIG. 1b.

A mobile communication device, referred to herein as a smartphone 100, includes audio and visual elements that provide great benefit to consumers but may be abused by third-party organizations who may be listening or watching via the audible and visual elements without permission of the consumer. More particularly, the video capability of a smart phone may include one or more cameras. These typically include a front camera 104a located in a front face of the smartphone 100 between a top edge 106 and screen 105 of the smartphone 100, and a rear camera 104b located in a rear face of the smartphone 100 in either an upper right or upper left corner of the rear face (FIGS. 3a and 3c). In recent generations of smartphones, the rear camera 104b is often quite large and comprises multiple lenses. Similarly, the audio capability of a smartphone 100 may include one or more microphones. These typically include a lower microphone 102b located in a bottom edge 107 of the smartphone 100 adjacent a charging port 108 by which the smartphone 100 is recharged via an electric cable, and an upper microphone 102a located in an upper corner of the smartphone 100 adjacent the rear camera 104b (FIGS. 3a and 3c).

With each new generation of smartphones, the cameras 104a, 104b and microphones 102a, 102b have become increasingly sophisticated, capable of capturing and reproducing sounds and images that are progressively more realistic. Indeed, smartphone cameras and microphones are engineered to collect data that is as detailed as possible. This, of course, ceases to be beneficial to the consumer when his privacy is invaded. Consequently, there is a need for a security device such as the mobile phone case 10 subsequently described.

The mobile phone case 10 includes a cradle portion 20 (FIG. 5) that is specifically configured and dimensioned to receive, hold, and protect a smartphone 100 having the previously described microphone 102a, 102b and camera 104a, 104b elements. More particularly, the cradle portion 20 may include a pair of side walls 21 parallel to and laterally displaced relative to one another, each side wall 21 having a linear and elongate configuration and potentially constructed of plastic or metal rectangular tube stock. Further, the cradle portion 20 may include a top wall 22 extending between upper ends of the pair of side walls 21 and a bottom wall 23 between the lower end of the pair of side walls 21, the top and bottom walls also having linear configurations and constructed of plastic or metal rectangular tube stock or the like. It is understood that the cradle portion 20 may have rounded or curved corners and may have a unitary construction. Each sidewall 21 may define various slots or apertures (FIGS. 4 and 5) having dimensions suitable for receiving corresponding buttons of the smart phone 100 so that operation of the smart phone 100 is not inhibited in any way by the cradle portion 20. Similarly, the bottom wall 23 may define various slots or apertures (FIGS. 4 and 5) configured to allow normal function of the lower microphone 102b, charging port 108, and an output speaker 109. Together, the side, top, and bottom walls form a peripheral and continuous edge defining a void 24 having a dimension for receiving and securely holding the smart phone 100 in a friction fit arrangement, i.e., the smart phone 100 is removably positioned within the boundary of the cradle portion 20. As will be understood by the description below, the case of the smartphone itself does not change configurations but, rather, the upper and lower portions 30, 40 are selectively movable relative to the cradle portion 20.

Figure 4:
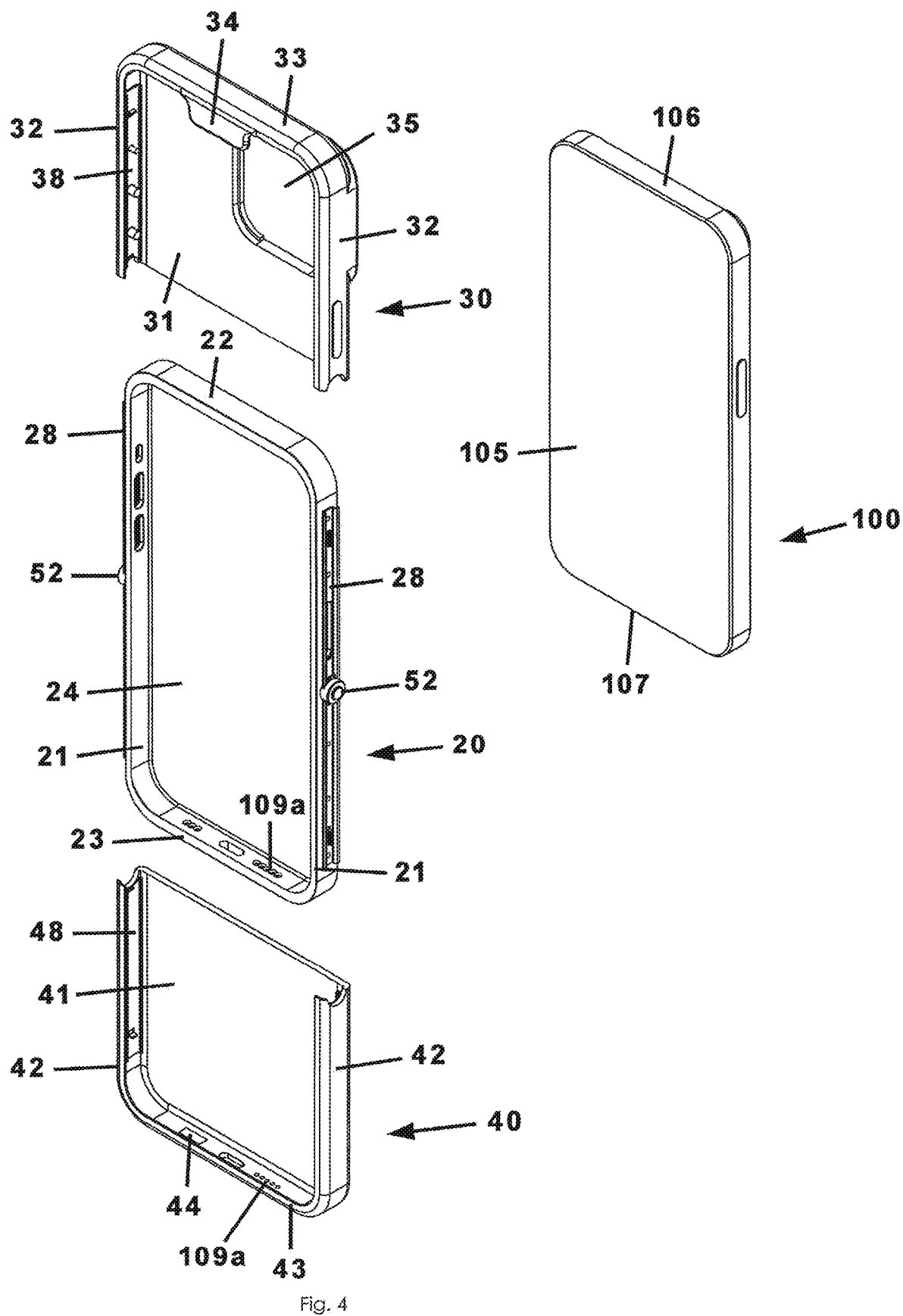
Figure 6:
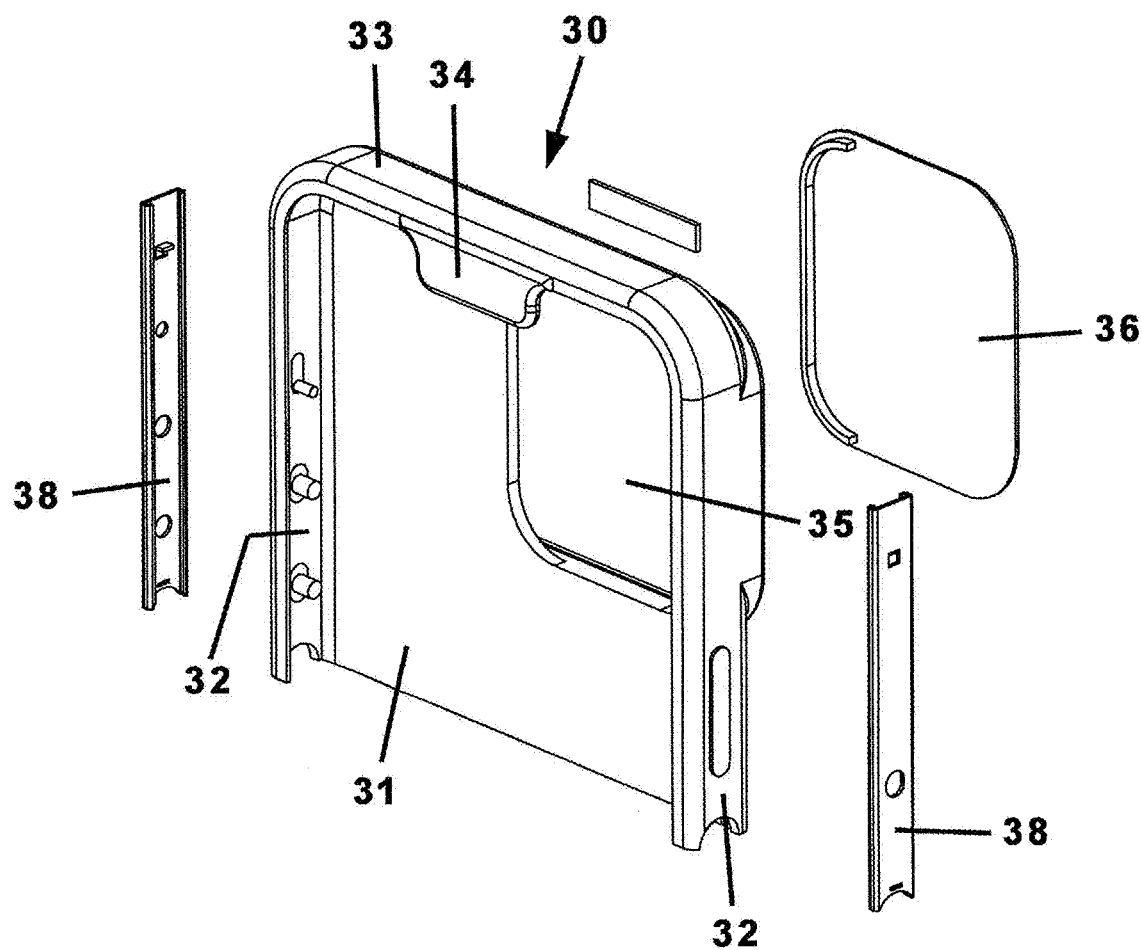
FIG. 6 is an exploded view of the upper frame portion of the mobile phone case according to the present invention.

The upper frame portion 30 (which may also be referred to as the upper portion 30 or upper portion of the frame) includes a backplate 31, a pair of laterally spaced apart and parallel side rails 32, and a top rail 33 extending between upper ends of the side rails 32 (FIGS. 4 and 6). It is understood that the side rails 32 may define various slots or apertures through which buttons on the smart phone 100, such as on/off or volume or action buttons, may protrude and may be functionally accessed. The backplate 31 represents a rear face and the upper portion 30 defines a front face that is open—the side rail 32 and top rail 33 defining a depth and open area into which an upper section or extent of the cradle portion 20 may be received as will be described in more detail later.

In an embodiment, a first camera cover 34 (FIG. 6) is coupled to a front edge of the top rail 33 and extends downwardly in the direction of the open front face and may be seen as being parallel to the backplate 31. As will be understood by one familiar with a smartphone 100, the first camera cover 34 may be configured and dimensioned to cover the view of a front camera of the smartphone 100. In an embodiment, the first camera cover 34 may be constructed using an opaque material or paint.

Figures 1A, 1B:
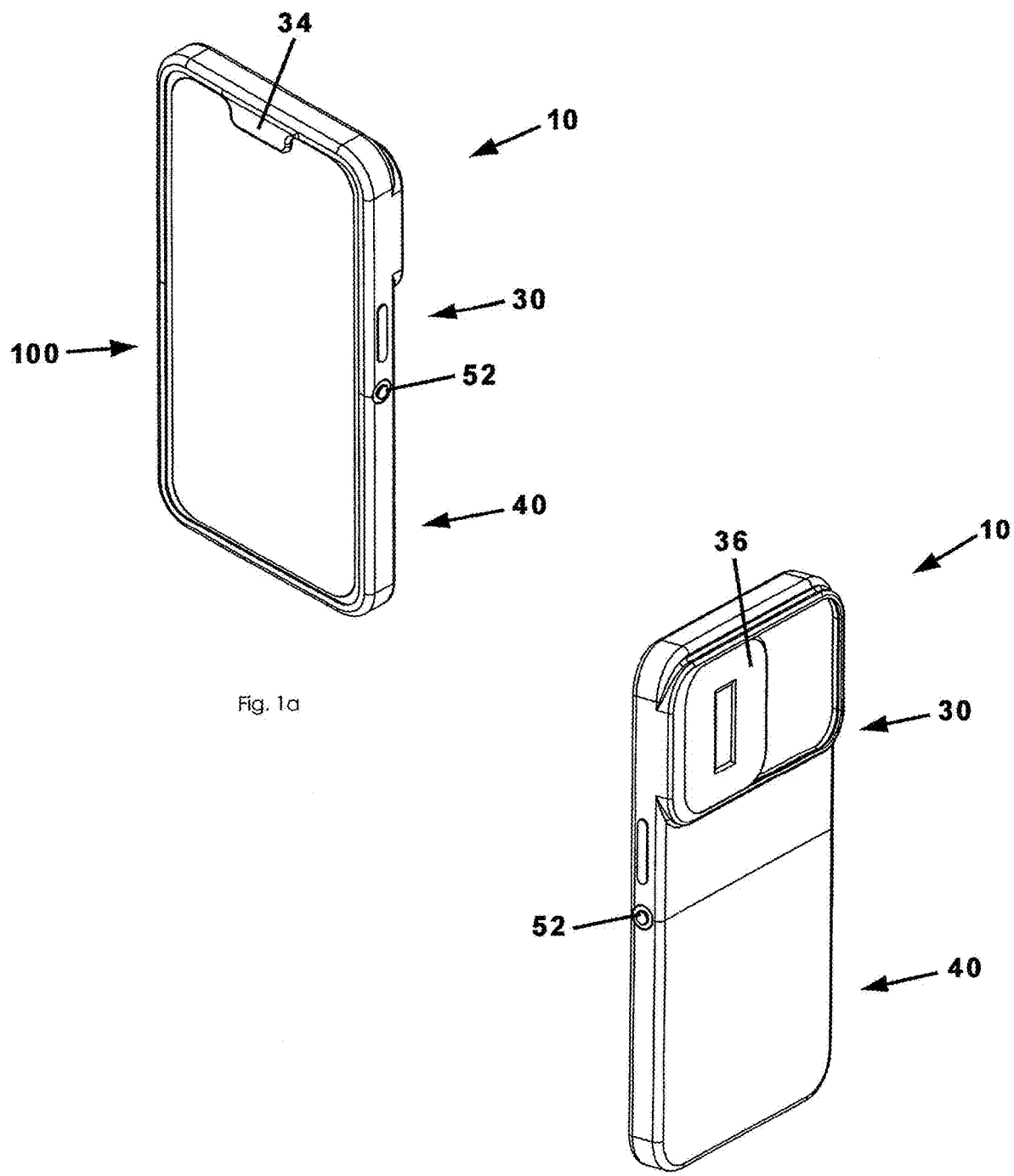
FIG. 1a is a front perspective view of the mobile phone case in use with a smart phone according to a preferred embodiment of the present invention.
FIG. 1b is a rear perspective view of the mobile phone case in use with a smart phone according to the present invention.

Further, the upper frame portion 30 may define an aperture 35 that is large enough that the one or more rear cameras 104*b* and upper microphone 102*a* are visible and are unblocked when uncovered (FIG. 6). More particularly, the upper frame portion 30 may include a second camera cover 36 that is laterally movable between a closed configuration blocking the rear cameras 104*b* and microphone 102*a* and an open configuration exposing and allowing the rear cameras 104*b* and microphone 102*a* to function normally (FIGS. 1*b* and 3*c*). In an embodiment, the second camera cover 36 may be slidably coupled to the upper frame portion 30 and slidably movable laterally between open and closed configurations as described above. In another embodiment, the second camera cover 36 may be pivotally coupled to the upper frame portion 30, such as with a hinge or the like.

Figure 5:
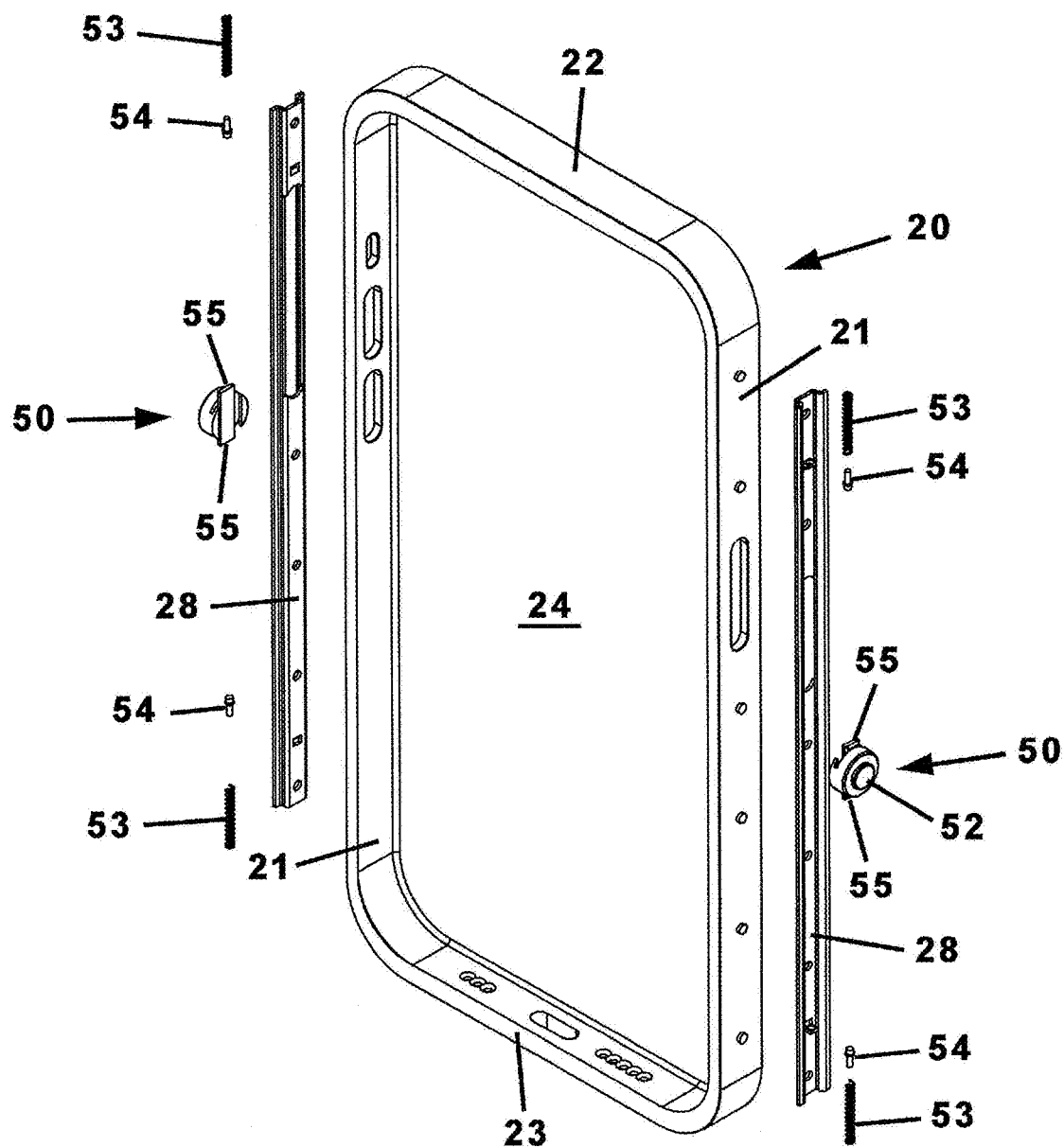
FIG. 5 is an exploded view of the cradle portion of the mobile phone case according to the present invention.

In an important aspect, the upper frame portion 30 may be coupled to an upper extent of the cradle portion 30 with complementary rail assemblies. More particularly, rail assemblies mounted on the inner surfaces of the upper frame portion 30 are complementary to rail assemblies on the outer surfaces of the sidewalls 21 of the cradle portion 20 such that the upper frame portion 30 is slidably movable along its upper track assembly 38 interacting with the corresponding cradle rail 28. Even more particularly, it is the upper track assemblies 38 that are coupled to the inner surfaces of the side rails 32 (FIGS. 4 and 6) that are configured to mate with corresponding cradle rails 28 that are attached to outer surfaces of sidewalls 21 of the cradle portion 30 (FIGS. 4 and 5). It is understood that the cradle rails 28 may have an inset or recessed configuration that forms a track for receiving corresponding side rails 32 in a slidable engagement.

Figure 7:
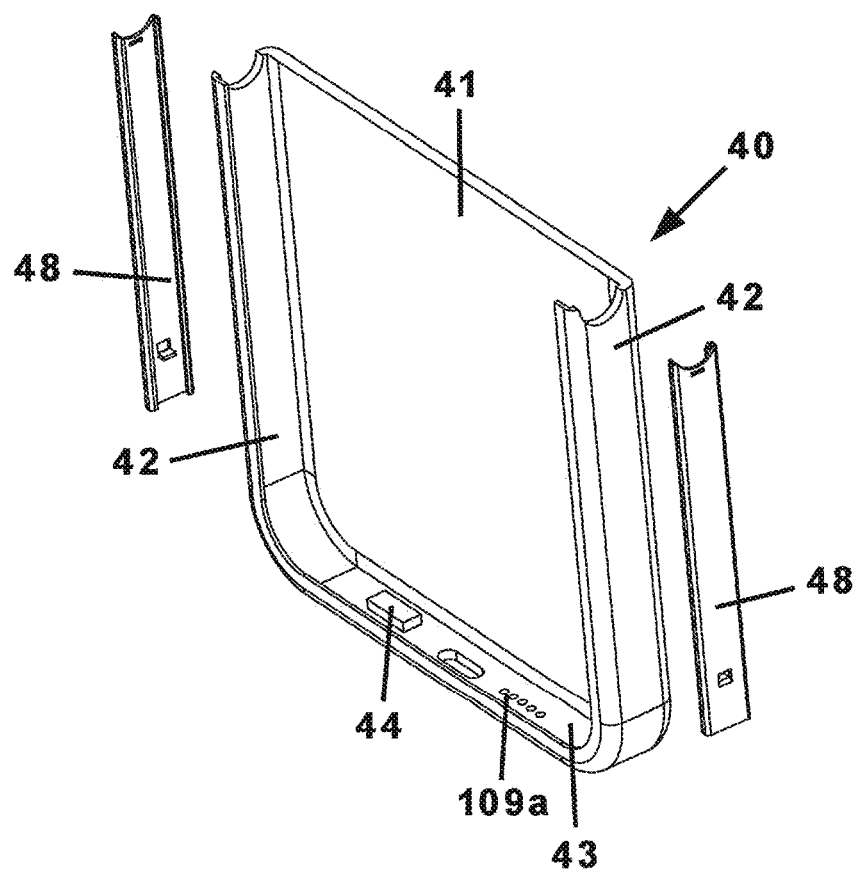
FIG. 7 is an exploded view of the lower frame portion of the cradle.
Figure 8A:
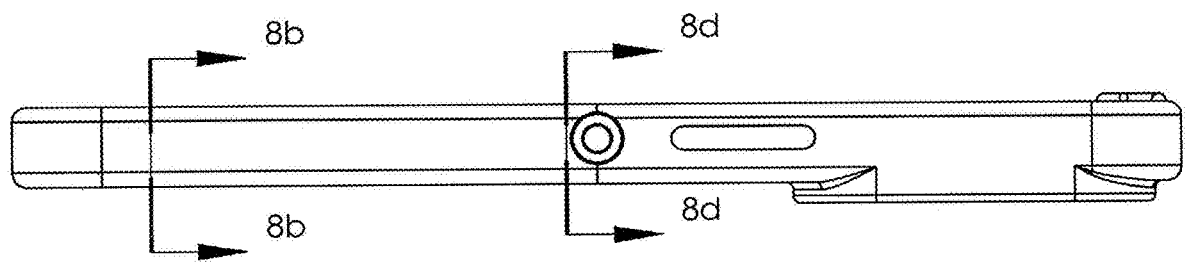
FIG. 8a is a side view of the cradle as in FIG. 5.
Figure 8B:
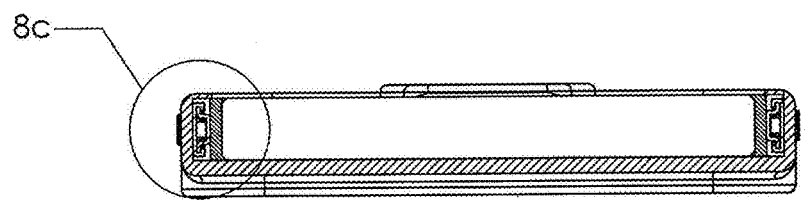
Figure 8C:
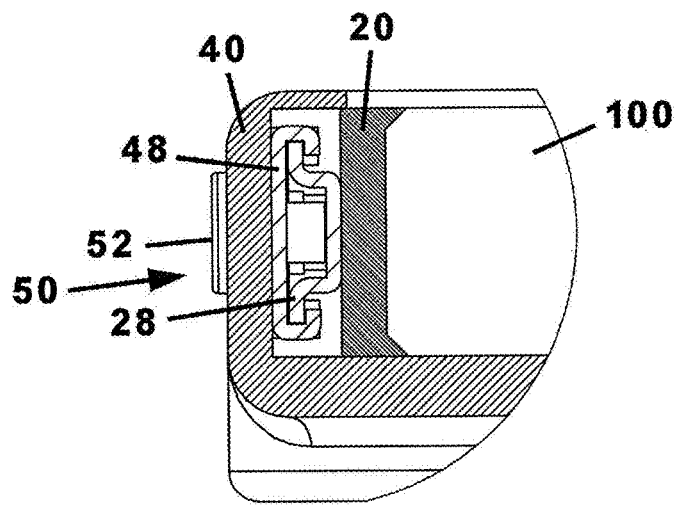
FIG. 8c is an isolated view on an enlarged scale taken from FIG. 8b.
Figure 8D:
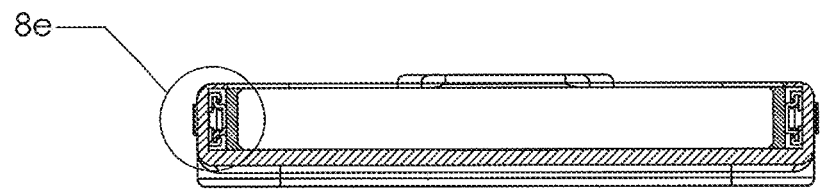
Figure 8E:
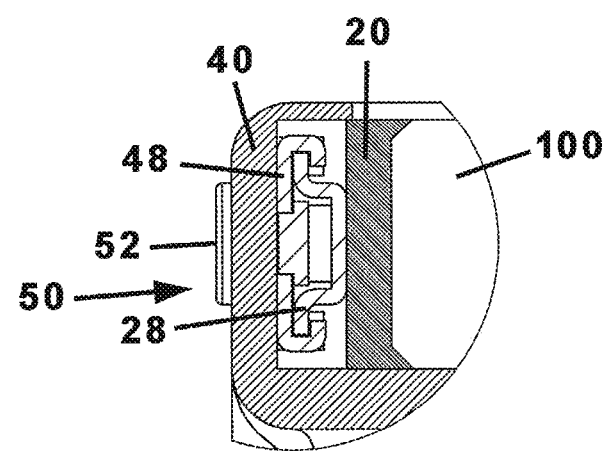
FIG. 8e is an isolated view on an enlarged scale taken from FIG. 8b.

Similarly, the lower frame portion 40 (which may also be referred to as a lower portion 40 or a lower portion of the frame) may include a backplate 41, a pair of laterally spaced apart and parallel side rails 42 and a bottom rail 43 extending between lower ends of the side rails 42. It is understood that the bottom rail 43 may define various slots or apertures through which the charging port 108 may be functionally accessed and the output speaker 109 may be allowed to propagate sound without being muffled (FIGS. 4 and 7). The backplate 41 represents a rear face and the lower portion 40 defines a front face that is open—the side rails 42 and bottom rail 43 defining a depth and open area into which a lower section or extent of the cradle portion 20 may be received as will be described in more detail later.

Further, a dampening member 44 (FIG. 7) consisting of acoustic foam 44*a* or some similar material may be attached to the inner surface of the bottom rail 43 to prevent external sound from reaching the lower microphone 102*b*. In this embodiment, the acoustic material will be attached at the site of the lower microphone 102*b* and may be adjacent to, but may not cover, the slots or apertures allowing for function of the charging port 108 and output speaker 109.

In an important aspect, the lower frame portion 40 may be coupled to a lower extent of the cradle portion 20 with complementary rail assemblies. More particularly, rail assemblies mounted on the inner surfaces of the lower frame portion 40 are complementary to rail assemblies on the outer surfaces of the sidewalls 21 of the cradle portion 20 such that the lower frame portion 40 is slidably movable along its lower track assembly 48 interacting with the corresponding cradle rail 28. Even more particularly, it is the lower track assemblies 48 that are coupled to the inner surfaces of the side rails 42 (FIGS. 4 and 7) that are configured to mate with corresponding cradle rails 28 that are attached to outer surfaces of sidewalls 21 of the cradle portion 20 (FIGS. 4 and 5). It is understood that the cradle rails 28 may have an inset or recessed configuration that forms a track for receiving corresponding side rails 42 in a slidable engagement.

Figures 2A, 2B:
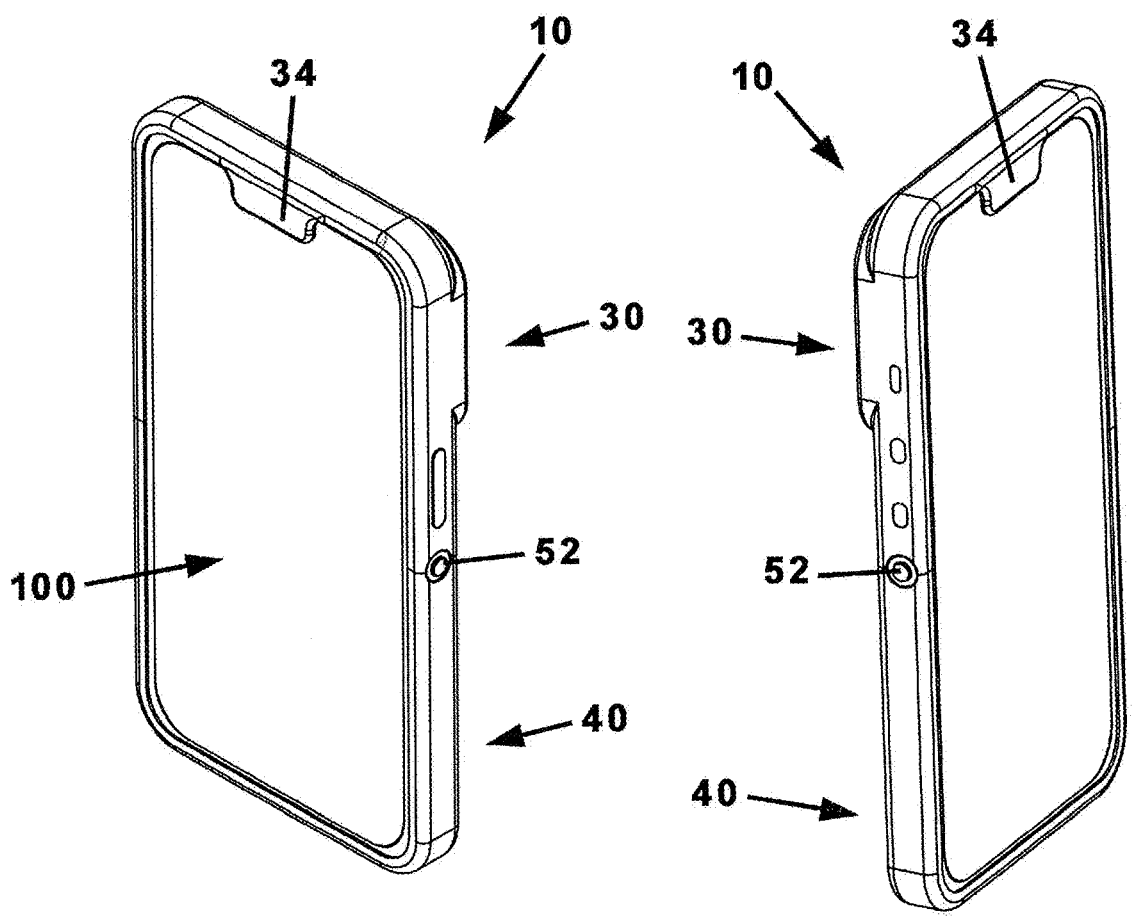
FIGS. 2a to 2c are perspective front views of the mobile phone case in use with a smart phone as in FIG. 1a, illustrated in a closed configuration.
Figure 2C:
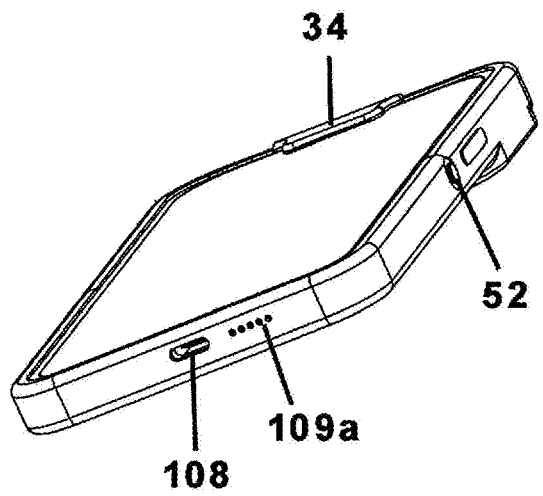

In another critical aspect, the mobile phone case 10 may include a selector assembly 50 which, when actuated, causes the upper and lower frame portions 30, 40 to move from a closed configuration to an open configuration. In the closed configuration (FIGS. 1 and 2), the front camera 104*a* and the lower microphone 102*b* are covered or blocked by the first camera cover 34 and dampening member 44 respectively. In moving to the open configuration (FIG. 3), the upper and lower portions 30, 40 slide laterally and away from each other due to the mechanism described below. This movement prevents the first camera cover 34 from covering the front camera 104*a* and prevents the dampening member 44 from blocking the lower microphone 102*b*. The closed configuration may be restored via manual pressure applied to the upper and lower portions 30, 40 of the frame, thus overcoming the natural spring bias of the selector assembly 50.

As described in previous paragraphs, the second camera cover 36 may operate independently of the selector assembly 50. Therefore, it may be possible for the second camera cover 36 to be in the open configuration while the upper and lower portions 30, 40 of the frame are in the closed configuration, and likewise with the reverse. When both features are in the open configuration, no normal functions of the smartphone 100 are inhibited.

Further, the selector assembly 50 may include a spring mechanism 51. This spring mechanism 51 may be operatively coupled to both the upper and lower frame portions 30, 40 and configured to bias them toward the open configuration (FIGS. 10*b* and 12*b*). More particularly, the spring mechanism 51 may include a spring-loaded button portion 51 and four individual springs 53, each one operatively coupled to either the upper or lower frame portion 30, 40 and to an upper or lower extremity of a cradle rail 28 via a complementary spring guide 54.

Figure 9D:
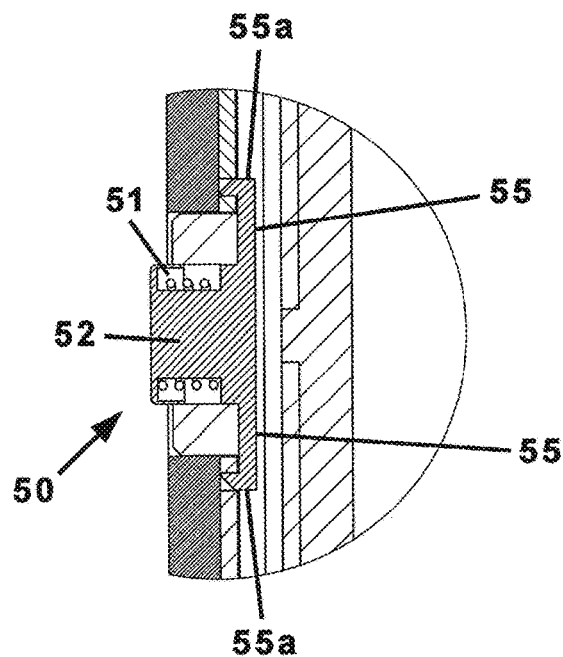
FIG. 9d is an isolated view on an enlarged scale taken from FIG. 9b.
Figure 9F:
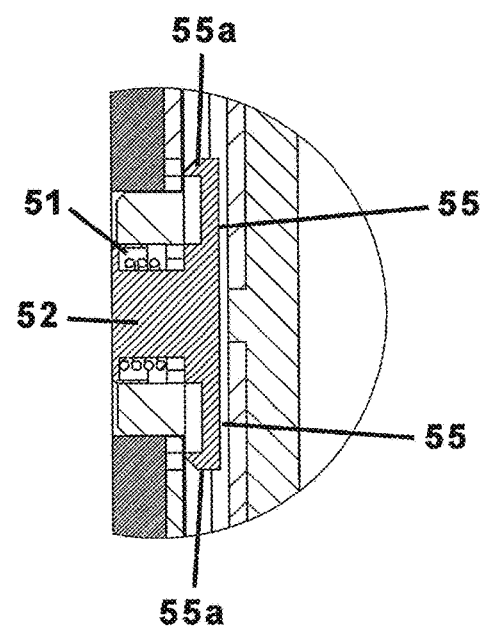
FIG. 9f is another isolated view as in FIG. 9e, illustrated with the switch assembly in an unlatched configuration.

Even further, the selector assembly 50 may include a pair of selector buttons 52. One selector button 52 may be coupled to each cradle rail 28 intermediate the upper extent and lower extent thereof and operatively coupled to the spring mechanism 51 via a linkage 55 (FIG. 5). In an embodiment, this linkage 55 includes a pair of hooks 55*a* configured to latch onto the upper and lower portions 30, 40 of the outer frame and prevent movement toward the open configuration. FIG. 9*d* illustrates this latched configuration. In this way, the linkage 55 functions as a locking mechanism, maintaining the upper and lower frame portions 30, 40 in the closed configuration until the selector button 52 is pressed. When the selector button 52 is pressed, the linkage 55 (and, specifically, the hooks 55*a*) simultaneously releases, allowing the springs 53 to move from being compressed (FIGS. 9*b* and 9*c*) to being deployed/lengthened (FIGS. 10*b* and 10*c*). FIG. 9*f* illustrates this unlatched and released configuration. In other words, operation of the spring-loaded 51 selector button 52 causes the upper and lower frame portions 30, 40 to move quickly and automatically from the closed configuration to the open configuration by operation of compression springs 53.

Figure 9E:
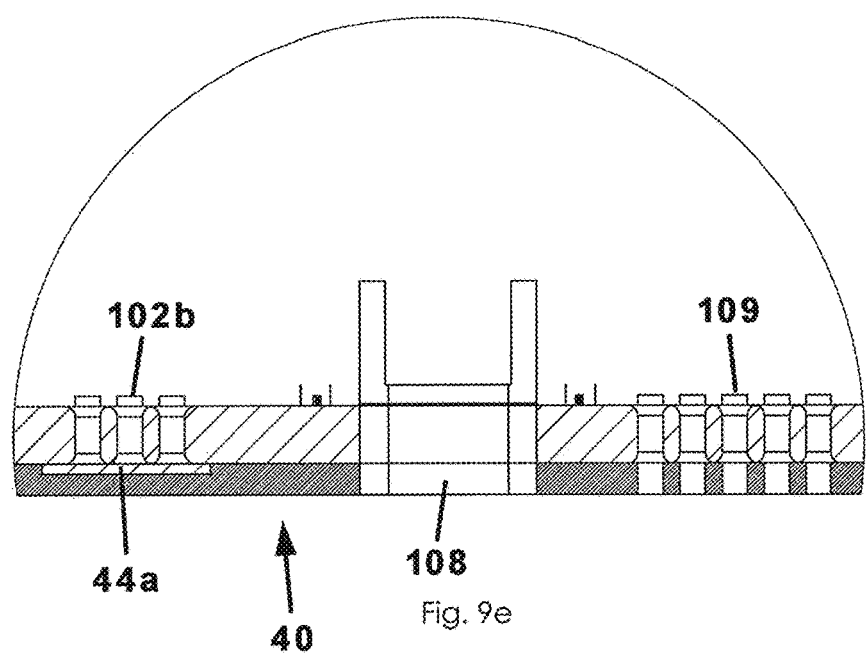
FIG. 9e is an isolated view on an enlarged scale taken from FIG. 9b, illustrated with the switch assembly in a latched configuration.
Figure 10E:
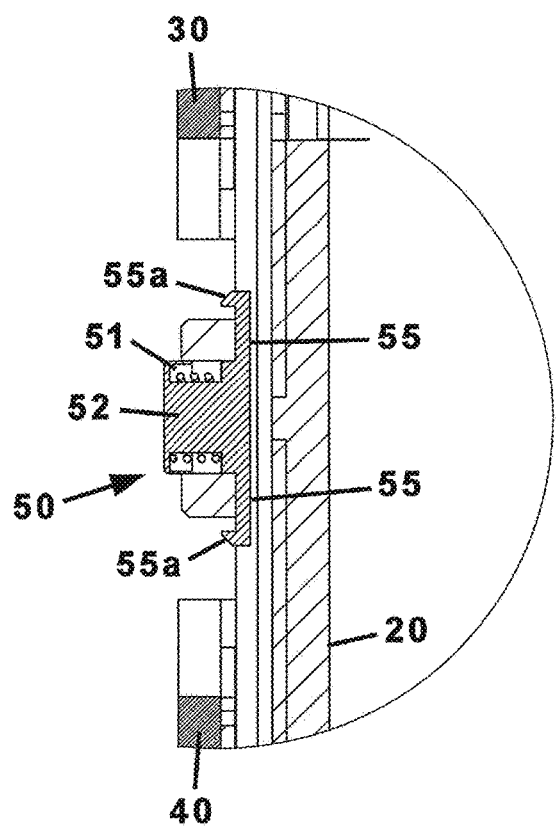
FIG. 10e is an isolated view on an enlarged scale taken from FIG. 10b.
Figure 10E:
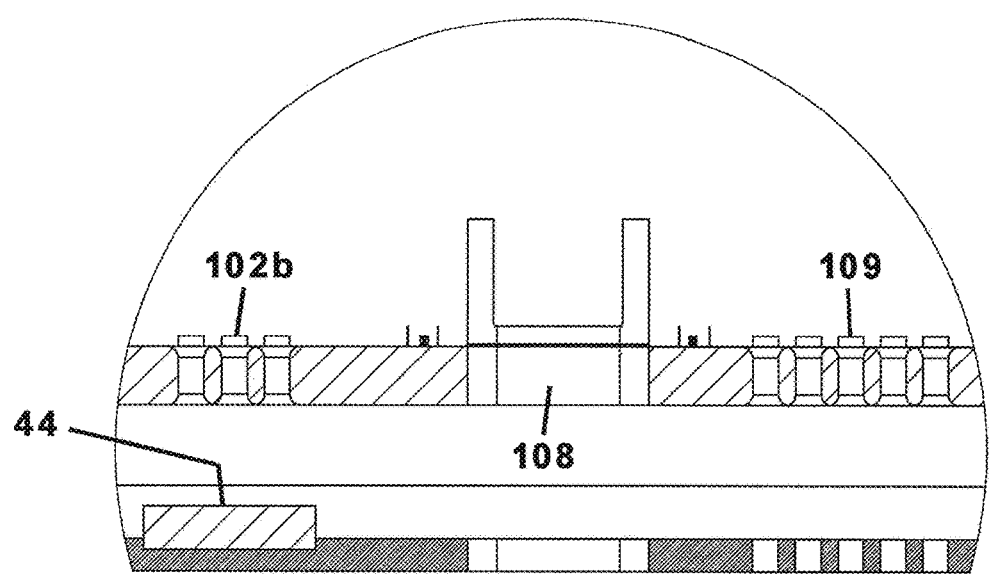

Of critical importance, (1) FIG. 9e illustrates how at the closed configuration the microphone 102b holes of a smart phone 100 are blocked by acoustic foam 44a in the lower portion 40 of the mobile phone case 10 and (2) FIG. 10e illustrates how at the open configuration the microphone 102b holes of a smart phone 100 are unblocked in the lower portion 40 of the mobile phone case 10. At both configurations, however, the output speaker holes 109 are left open at both the closed configuration (FIG. 9e) and at the open configuration (FIG. 10e). In other words, the speaker associated with the smart phone 100 is able to emit sound, such as for playing music, podcasts, and the like whether the protective phone case 10 is opened or closed.

It is understood that while certain forms of this invention have been illustrated and described, it is not limited thereto except insofar as such limitations are included in the following claims and allowable functional equivalents thereof.

What is claimed is:

1. A mobile phone case with privacy controls for a smartphone having a front camera, a rear camera, an upper microphone, and a lower microphone, said mobile phone case comprising:
   a cradle portion capable of receiving the smartphone in a friction fit configuration;
   an upper frame portion coupled to an upper section of the cradle portion via an upper track assembly;
   a lower frame portion coupled to a lower section of the cradle portion via a lower track assembly;
   wherein said upper and lower frame portions are slidably movable along said upper and lower track assemblies, respectively, between a closed configuration bearing against and covering the upper and lower microphones and the front and rear cameras of the smartphone, respectively, and an open configuration displaced from and not covering the upper and lower microphones or the front and rear cameras of the smartphone, respectively;
   a pair of cradle rails positioned on either outer side of said cradle portion, each cradle rail having an elongate and linear configuration extending between upper and lower end sections of said cradle portion and defining a cradle track;
   a selector assembly coupled to said cradle portion and operatively coupled to said upper and lower frame portions for simultaneously and automatically urging said upper and lower frame portions toward the open configuration when actuated;
   wherein said selector assembly includes a spring mechanism operatively coupled to both the upper and lower frame portions and configured to spring bias said upper and lower frame portions in opposite directions to one another and towards the open configuration;
   wherein said selector assembly includes a selector button coupled to each cradle rail and operatively coupled to said spring mechanism via a linkage for simultaneously releasing the upper and lower frame portions from said closed configuration to said open configuration when actuated; and
   wherein said upper and lower frame portions include dampening members configured to block audio signals and visual images when said upper and lower frame 31 portions are in the closed configurations, respectively.

2. The mobile phone case of claim 1, wherein the cradle portion includes a continuous peripheral frame assembly that selectively surrounds the smartphone.

3. The mobile phone case of claim 1, wherein said upper track assembly includes a pair of upper portion rails positioned on either inner side of said upper frame portion, each upper portion rail having an elongate and linear configuration 8 and defining an upper track corresponding to an upper extent of each cradle rail for slidable movement therealong.

4. The mobile phone case of claim 3, wherein said lower track assembly includes a pair of lower portion rails positioned on either inner side of said lower frame portion, each lower portion rail having an elongate and linear configuration and defining a lower track having a configuration that is complementary to a lower extent of each cradle rail for slidable movement therealong.

5. The mobile phone case as in claim 1, wherein said upper frame portion includes a first camera cover coupled to an upper wall thereof and that is configured to block digital images taken by the front camera of the smartphone when said upper frame portion is in said closed configuration.

6. The mobile phone case as in claim 1, further comprising a camera cover operatively coupled to the upper frame portion and that is movable between a closed configuration blocking the rear camera of the smartphone and an open configuration displaced from the rear camera.

7. The mobile phone case as in claim 6, wherein the camera cover is slidably movable between said open and closed configurations.

8. The mobile phone case as in claim 6, wherein the camera cover is pivotally movable between said open and closed configurations.

9. The mobile phone case as in claim 1, wherein the upper and lower frame portions are constructed from an opaque material to ensure visual privacy when in the closed configuration.

10. The mobile phone case as in claim 1, wherein said dampening members include acoustic foam specifically configured to absorb frequencies in the range of human speech so as to ensure effective audio privacy.

11. The mobile phone case as in claim 1, wherein the linkage is a locking mechanism having a pair of hooks that maintains the upper and lower frame portions in the closed configuration until the selector button is actuated so as to release said hooks.

12. The mobile phone case as in claim 1, wherein side walls of said cradle portion define openings corresponding to action buttons associated with the mobile phone and through which said action buttons are selectively actuated.

13. A mobile phone case with privacy controls comprising:
   a cradle portion having a pair of side walls parallel to and spaced apart from one another, a top wall extending between upper ends of said pair of side walls and a bottom wall extending between lower ends of said pair of side walls, said walls, collectively, defining a void capable of receiving the smartphone in a friction fit configuration;
   an upper frame portion coupled to an upper section of the cradle portion via an upper track assembly;
   a lower frame portion coupled to a lower section of the cradle portion via a lower rail assembly;
   said upper and lower frame portions being slidably movable along said upper and lower track assemblies, respectively, between a closed configuration covering only said upper section and said lower section of said cradle portion and an open configuration overlapping (1) a portion of said upper section and extending upwardly beyond said top wall, respectively, and overlapping (2) a portion of said lower section and extending downwardly beyond said bottom wall, respectively;

a selector assembly coupled to said cradle portion and including a spring biased linkage operatively coupled to said upper and lower frame portions for simultaneously and automatically urging said upper and lower frame portions toward the open configuration when actuated;

wherein said selector assembly includes:
   a spring mechanism operatively coupled to both the upper and lower frame portions and configured to bias said upper and lower frame portions towards the open configuration; and
   a selector button coupled to each cradle rail intermediate said upper extent and said lower extent thereof and operatively coupled to said spring mechanism via a linkage for simultaneously releasing the upper and lower frame portions to move from said closed configuration to said open configuration; and wherein said upper and lower frame portions have dampening members that include acoustic foam configured to block audio signals and visual images generated by the smartphone when said upper and lower frame portions are in the closed configurations, respectively.

14. The mobile phone case as in claim 13, wherein:

said upper and lower portions of said cradle portion block upper and lower microphones and the front and rear cameras of the smartphone at said closed configuration, respectively; and said upper and lower portions of said cradle portion are displaced from said upper and lower microphones and said front and rear cameras of the smart phone at said open configuration, respectively.

15. The mobile phone case of claim 13, further comprising:

a pair of cradle rails positioned on either outer side of said cradle portion, each cradle rail having an elongate and linear configuration extending between upper and lower end sections of said cradle portion and defining a cradle track;

wherein said upper track assembly includes a pair of upper portion rails positioned on either inner side of said upper frame portion, each upper portion rail having an elongate and linear configuration and defining an upper track corresponding to an upper extent of each cradle rail for slidable movement therealong; and wherein said lower track assembly includes a pair of lower portion rails positioned on either inner side of said lower frame portion, each lower portion rail having an elongate and linear configuration and defining a lower track corresponding to a lower extent of each cradle rail for slidable movement therealong.

16. The mobile phone case as in claim 13, wherein:

the upper and lower frame portions are constructed from an opaque material to ensure visual privacy when in the closed configuration; and the acoustic foam is specifically configured to absorb frequencies in the range of human speech so as to cause audio privacy.

17. The mobile phone case as in claim 13, wherein said upper frame portion includes:

a first camera cover coupled to an upper end thereof and extending downwardly atop a front face thereof so as to block a front camera of the smartphone at said closed configuration; and a second camera cover operatively coupled to the upper end thereof and extending atop a rear face thereof and that is movable between a closed configuration blocking the rear camera of the smartphone and an open configuration displaced from the rear camera.

\* \* \* \* \*